US011091363B1

(12) United States Patent
Martin et al.

(10) Patent No.: US 11,091,363 B1
(45) Date of Patent: Aug. 17, 2021

(54) HANDS-FREE TANK FILL DEVICE

(71) Applicants: Blake Martin, Greensboro, NC (US);
Austin Hugh McGugan, Greensboro, NC (US)

(72) Inventors: Blake Martin, Greensboro, NC (US);
Austin Hugh McGugan, Greensboro, NC (US)

(73) Assignee: Camco Manufacturing, Inc., Greensboro, NC (US)

( * ) Notice: Subject to any disclaimer, the term of this patent is extended or adjusted under 35 U.S.C. 154(b) by 0 days.

(21) Appl. No.: 16/870,599

(22) Filed: May 8, 2020

(51) Int. Cl.
*B67D 7/02* (2010.01)
*F16L 33/02* (2006.01)
*B67D 7/38* (2010.01)

(52) U.S. Cl.
CPC ............ *B67D 7/0294* (2013.01); *F16L 33/02* (2013.01); *B67D 7/38* (2013.01)

(58) Field of Classification Search
CPC . B67D 7/40; F16L 3/003; B05B 15/60; B05B 15/065; A62C 33/04
USPC .............................. 248/75–93, 244, 318, 321
See application file for complete search history.

(56) References Cited

U.S. PATENT DOCUMENTS

| | | | | |
|---|---|---|---|---|
| 1,385,472 A | * | 7/1921 | Renn ..................... | B05B 15/622 248/86 |
| 1,806,074 A | * | 5/1931 | MacGregor ............ | A62C 31/28 248/86 |
| 2,045,336 A | * | 6/1936 | Skoglund ............... | A62C 31/28 248/80 |
| 2,147,963 A | * | 2/1939 | Casciotti ................. | F16B 2/248 24/554 |
| 2,531,867 A | * | 11/1950 | Wurdinger ............. | A01G 17/08 47/47 |
| 2,537,703 A | * | 1/1951 | Randa ...................... | F16L 3/00 248/75 |
| 2,557,570 A | * | 6/1951 | Seiger .................... | A61J 9/0638 248/104 |
| 2,873,999 A | * | 2/1959 | Webb ....................... | E03C 1/06 239/588 |
| 3,050,801 A | * | 8/1962 | Downey ............... | F16L 37/008 285/244 |
| 3,310,264 A | * | 3/1967 | Appleton ................. | F16L 3/12 248/72 |
| 3,504,388 A | * | 4/1970 | Tunstall .................. | F16L 3/003 7/169 |
| 3,554,474 A | * | 1/1971 | Davies ..................... | F16L 3/00 248/49 |
| 3,675,275 A | * | 7/1972 | Arblaster ............... | A44B 99/00 248/75 |
| 3,809,348 A | * | 5/1974 | Di Laura ................. | F16L 3/00 248/49 |
| 4,125,237 A | * | 11/1978 | Hagins .................... | E03F 1/008 138/106 |

(Continued)

*Primary Examiner* — Timothy L Maust

(74) *Attorney, Agent, or Firm* — Tuggle Duggins P.A.; Blake P. Hurt

(57) ABSTRACT

A hands-free device for use in filling tanks for storing liquids, particularly water tanks on recreational or commercial vehicles having either threaded or flange style collars. The device's spring clamp can be operatively moved between the open and closed positions to secure the clamp to the collar of the storage tank during use. The filler hose is then snapped into position within the body of the device which prevents inadvertent displacement.

17 Claims, 10 Drawing Sheets

(56) References Cited

U.S. PATENT DOCUMENTS

| | | | | |
|---|---|---|---|---|
| 4,569,105 A | * | 2/1986 | Weider | A63B 21/0728 24/544 |
| 5,542,713 A | * | 8/1996 | Miyazaki | F16L 3/04 285/136.1 |
| 5,816,298 A | * | 10/1998 | Stricklin | F16L 41/16 141/346 |
| 6,095,462 A | * | 8/2000 | Morgan | F16L 3/003 248/316.4 |
| 6,250,336 B1 | * | 6/2001 | Murphey | B60R 15/00 137/539 |
| 6,769,652 B1 | * | 8/2004 | Capan | B60T 17/046 248/65 |
| 8,091,594 B2 | * | 1/2012 | Ray | B60R 15/00 141/347 |
| 8,408,501 B2 | * | 4/2013 | Noyes | B60D 1/62 248/75 |
| 8,668,172 B2 | * | 3/2014 | Paulig | B05B 15/62 248/65 |
| 2015/0075824 A1 | * | 3/2015 | Multer | F16L 3/00 169/51 |
| 2018/0045340 A1 | * | 2/2018 | Berardi | F16L 11/04 |

\* cited by examiner

HANDS-FREE TANK FILL DEVICE

FIELD OF THE INVENTION

The invention herein pertains to accessories for the filling of liquid storage tanks, and more particularly pertains to a hands-free device for use in filling tanks for storing liquids, particularly water tanks on recreational or commercial vehicles.

DESCRIPTION OF THE PRIOR ART AND OBJECTIVES OF THE INVENTION

Many recreational and commercial vehicles carry a supply of fresh water. The term recreational vehicle ("RV") includes motorhomes, campervans, travel trailers, pop-up campers and other vehicles that are either self-propelled or which can be towed behind another vehicle, typically a car or truck. RVs are primarily used for vacations, camping trips, sports outings or other circumstances where temporary living accommodations are required. Some commercial vehicles, such as concession trailers and food service trucks also carry a supply of fresh water. Typically, on RVs and commercial vehicles, the water storage tank are filled with a hose. The end of the hose is inserted into the neck of the tank and the user holds the hose until the tank is full. On larger vehicles, that can take some time and it would be beneficial for that time to be spent on other tasks while the tank is being filled. However, there is a risk that if the process is not watched, the hose may slip from the neck, making a mess and wasting water.

U.S. Pat. No. 8,091,594 (the disclosure of which is incorporated herein by reference in its entirety) teaches a device to permit hands-free filling of tanks, such as water tanks on RVs. The device has a goose-neck hose swivel with a barbed connection at one end and a female threaded connection at the other end. The male threaded end is for attachment to a water supply, such as a garden hose, and a flexible hose is attached to the barbed end. A vented female threaded cap is placed adjacent to the barbed end for attachment to a threaded collar on the inlet of the tank, with the flexible hose placed within the fill neck of the tank. The threaded connections permit firm attachment of the hose to the storage tank. However, the device is complex and costly to manufacture and can only be used with a storage tank having a threaded style collar and cannot be used with a flange style collar.

Thus, in view of the problems and disadvantages associated with prior art devices, the present invention was conceived and one of its objectives is to provide a simple, inexpensive device for hands-free filling of fluid storage tanks that can be used with both threaded and flange style collars.

It is another objective of the present invention to provide a hands-free filling device that can be easily and readily coupled and de-coupled from a tank inlet collar.

It is still another objective of the present invention to provide a hands-free tank filling device that has a spring clamp for attachment to a tank inlet collar.

It is yet another objective of the present invention to provide a molded plastic clip to hold a water tank inlet tube during the filling operation.

Various other objectives and advantages of the present invention will become apparent to those skilled in the art as a more detailed description is set forth below.

SUMMARY OF THE INVENTION

In a preferred embodiment of the invention, the hands-free filler device has a body portion and a spring clamp connected to the body portion. The body portion has a pair of spaced-apart, curved ears that together form a semi-circular opening to secure a water filler tube therein. The spring clamp has a circular portion and a pair of legs. One leg is fixed in position and the other leg is free to move within a channel in the body portion. By moving the movable leg of the spring clamp toward the fixed leg, the diameter of the circular portion of the spring clamp is increased to enable the spring clamp to be placed over the collar of the tank. Once the movable leg is released, tension within the spring clamp will decrease the diameter of the circular portion to hold the spring clamp, and the body portion of the device, in place while the storage tank is filled.

DETAILED DESCRIPTION OF THE PREFERRED EMBODIMENT AND OPERATION OF THE INVENTION

Figure 1:
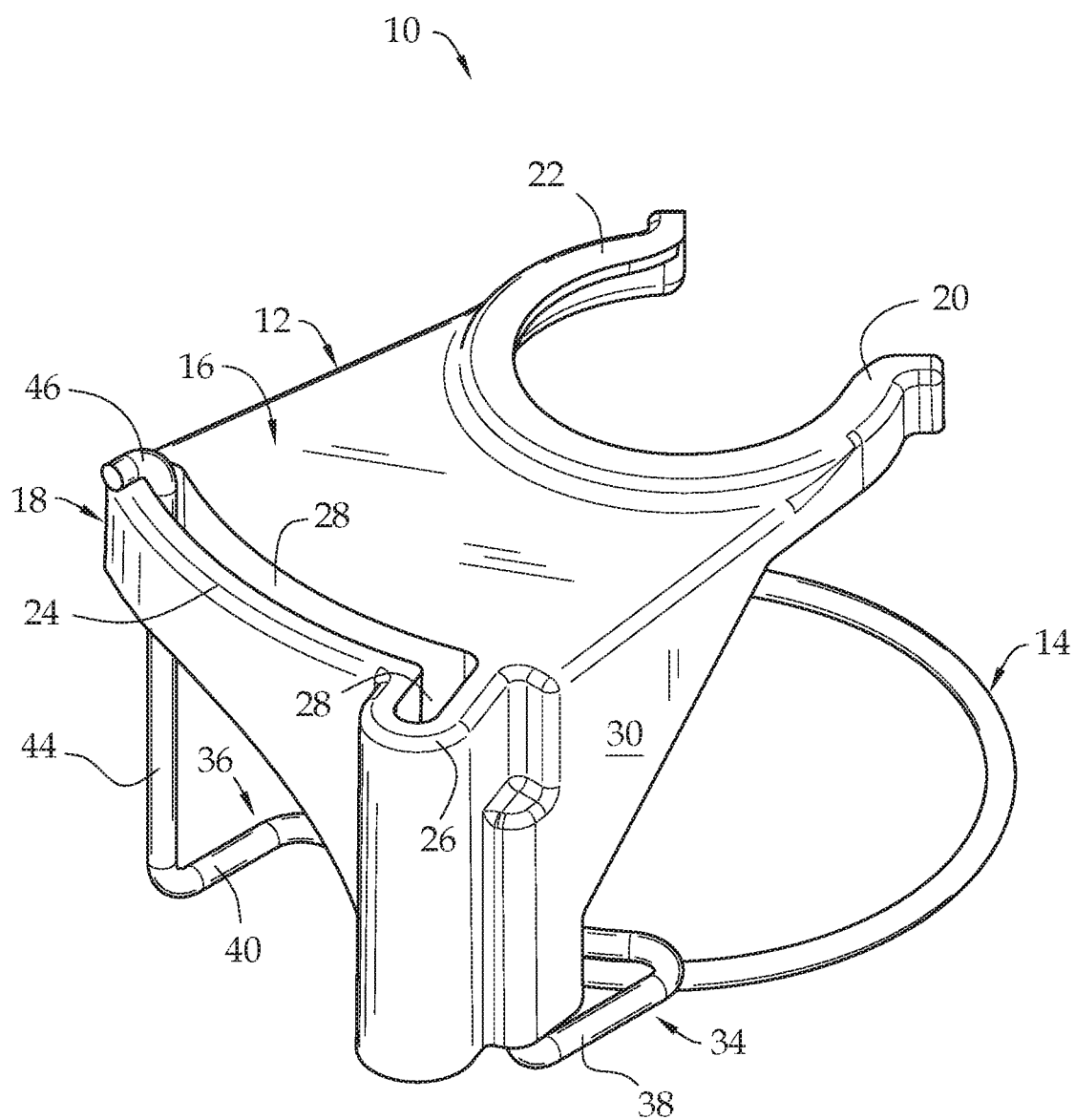
FIG. 1 is a front perspective view of a preferred embodiment of the hands-free filling device of the invention.
Figure 2:
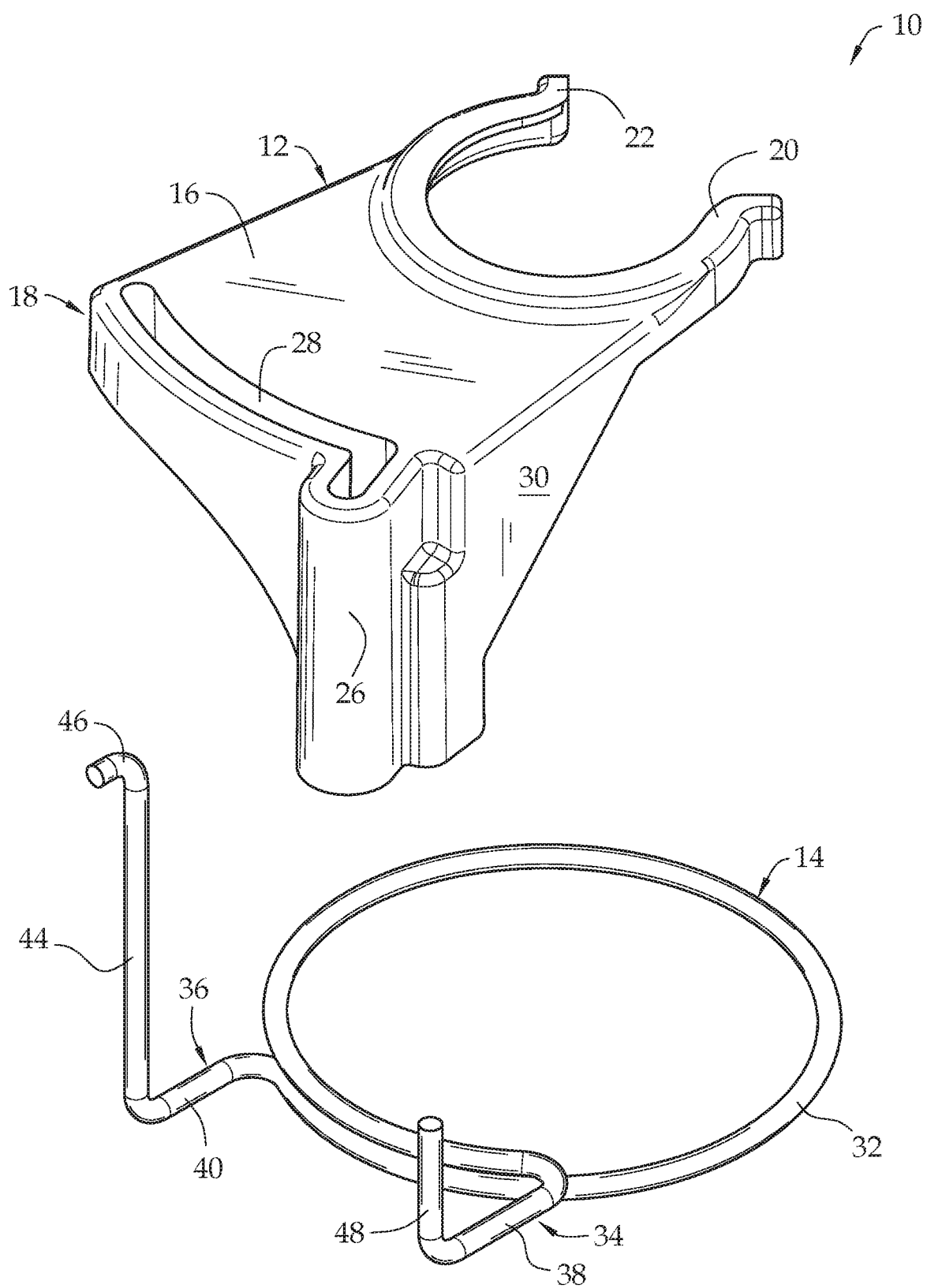
FIG. 2 is an exploded perspective view of a preferred embodiment of the hands-free filling device of the invention.
Figure 3:
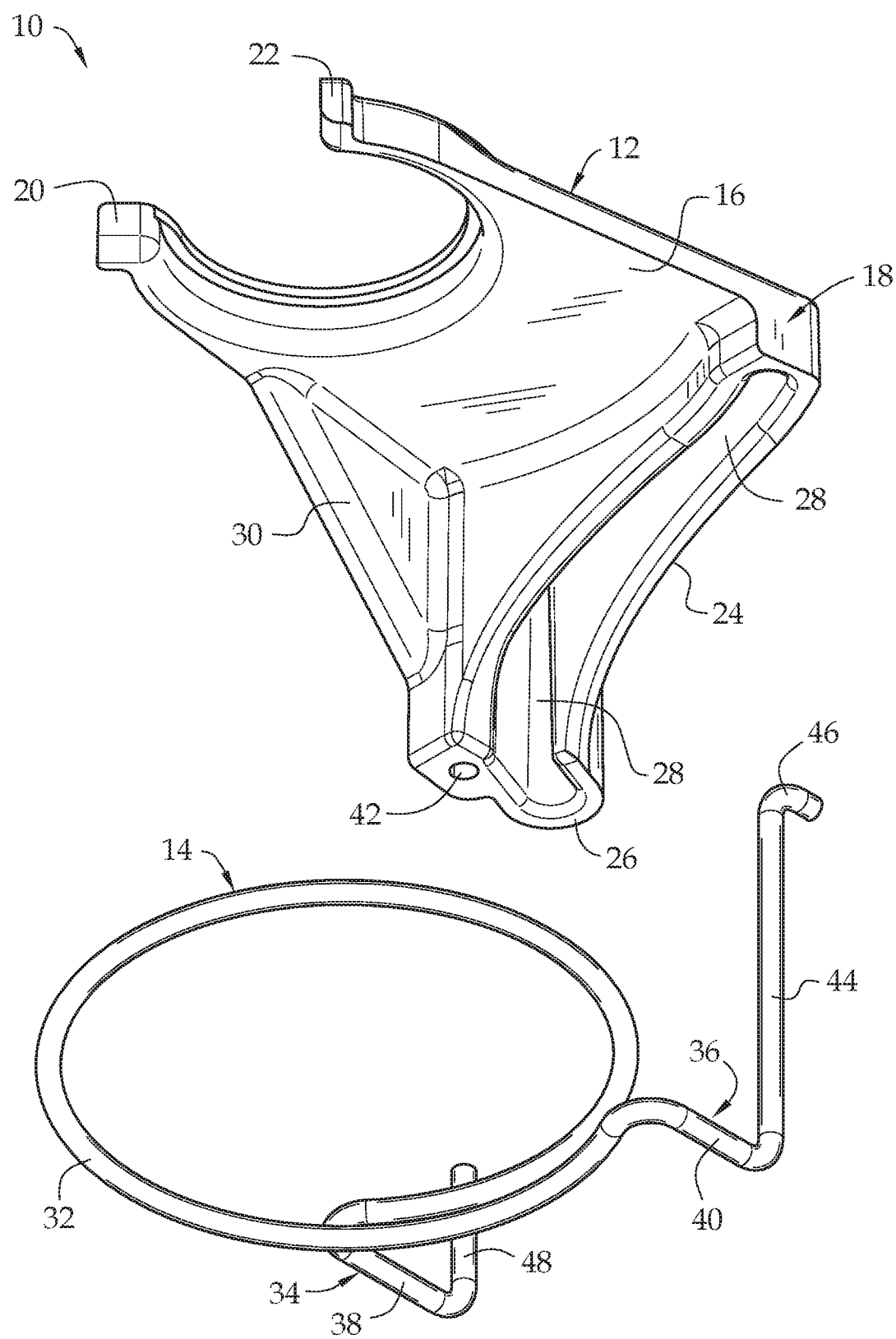
FIG. 3 is an exploded rear perspective view of a preferred embodiment of the hands-free filling device of the invention.
Figure 4:
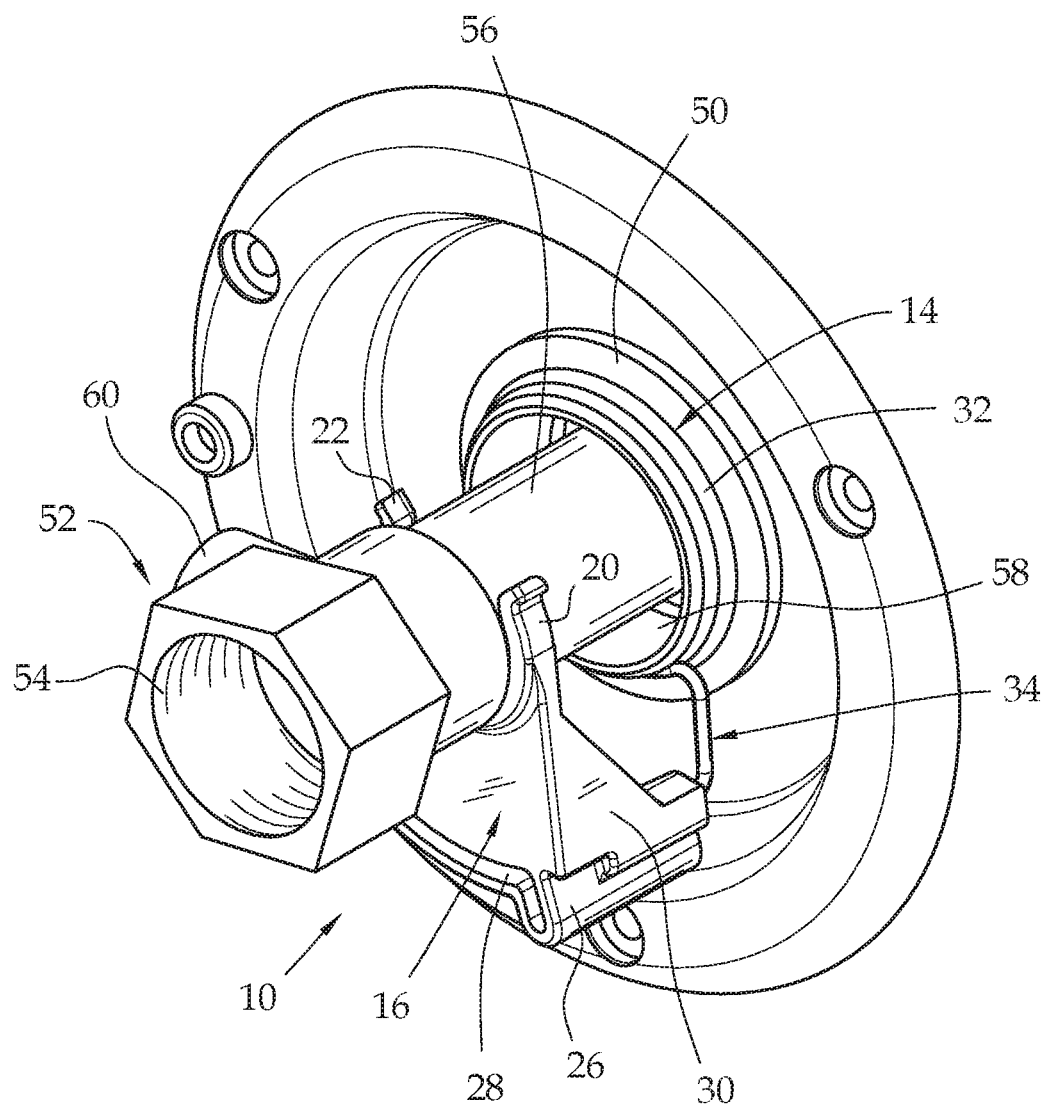
FIG. 4 is a front perspective view of a preferred embodiment of the hands-free filling device of the invention, shown in operative connection to a collar of a storage tank and with a water fill tube in place.
Figure 5:
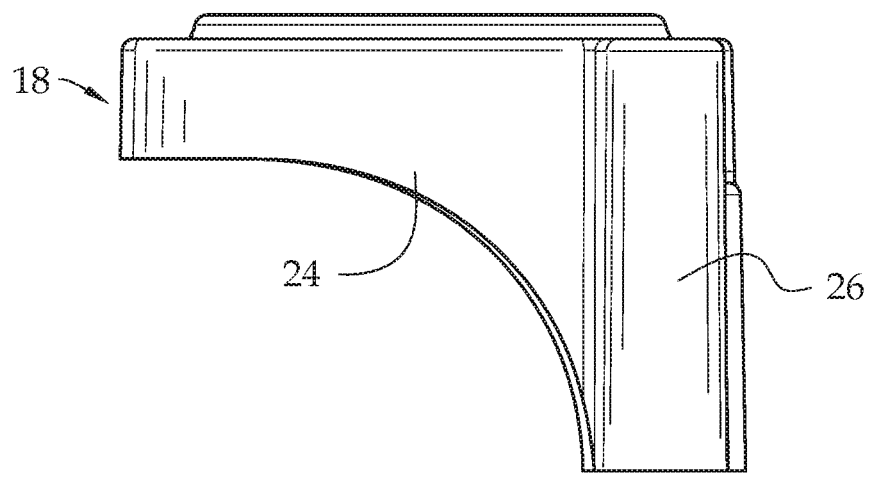
FIG. 5 is a bottom plan view of the body portion of the hands-free filling device.
Figure 6:
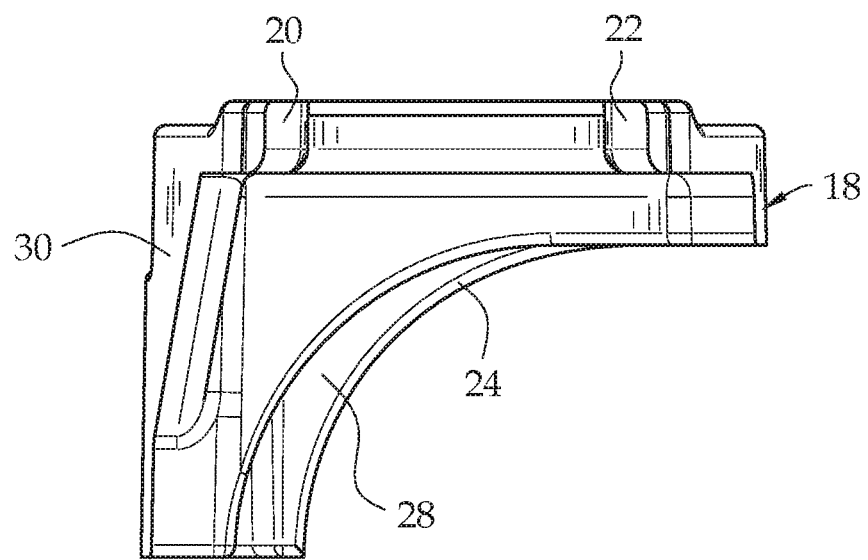
FIG. 6 is a top plan view of the body portion of the hands-free filling device.
Figure 7:
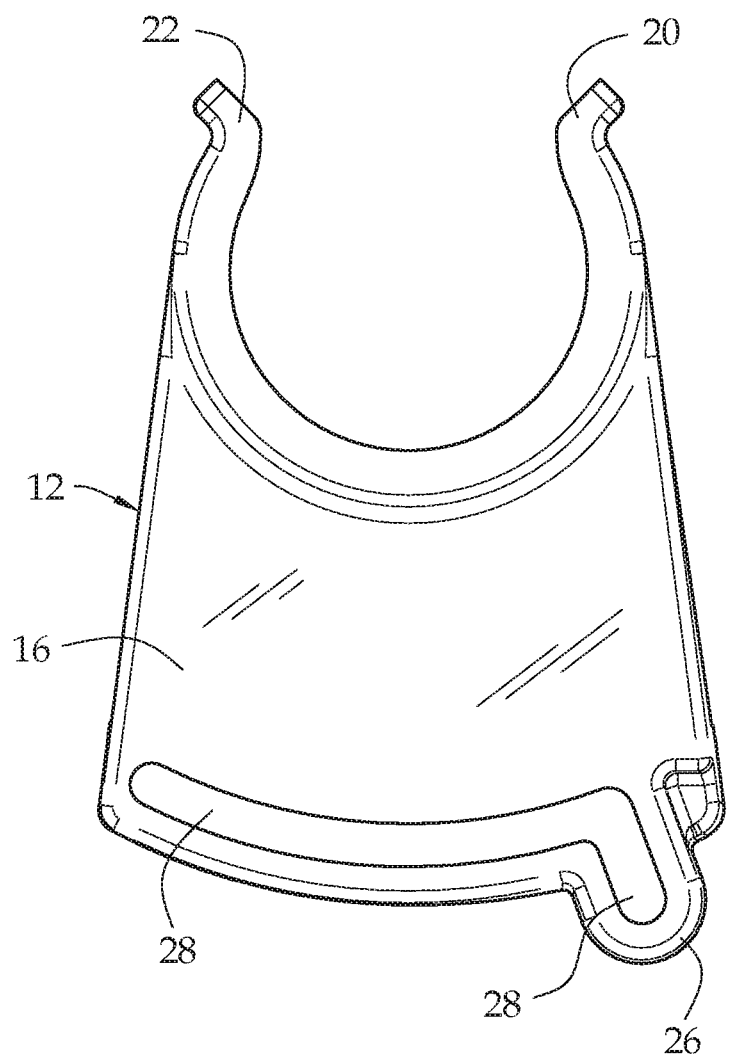
FIG. 7 is a front elevational view of the body portion of the hands-free filling device.
Figure 8:
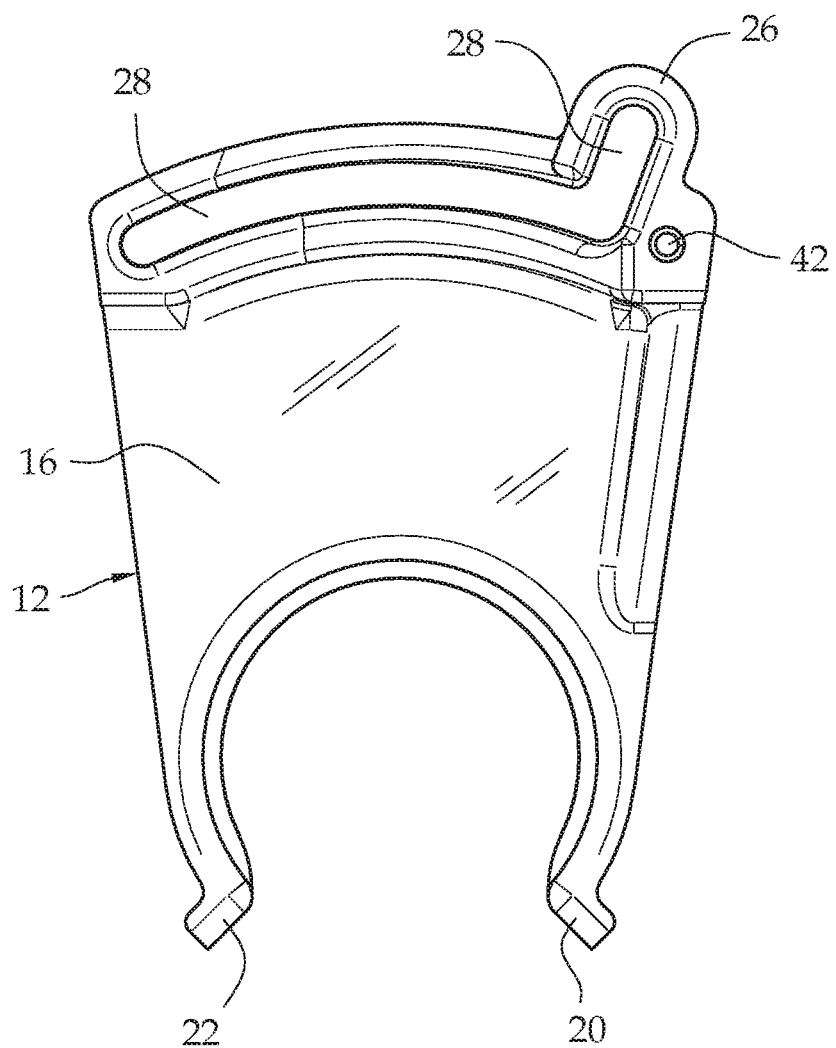
FIG. 8 is a rear elevational view of the body portion of the hands-free filling device.
Figure 9:
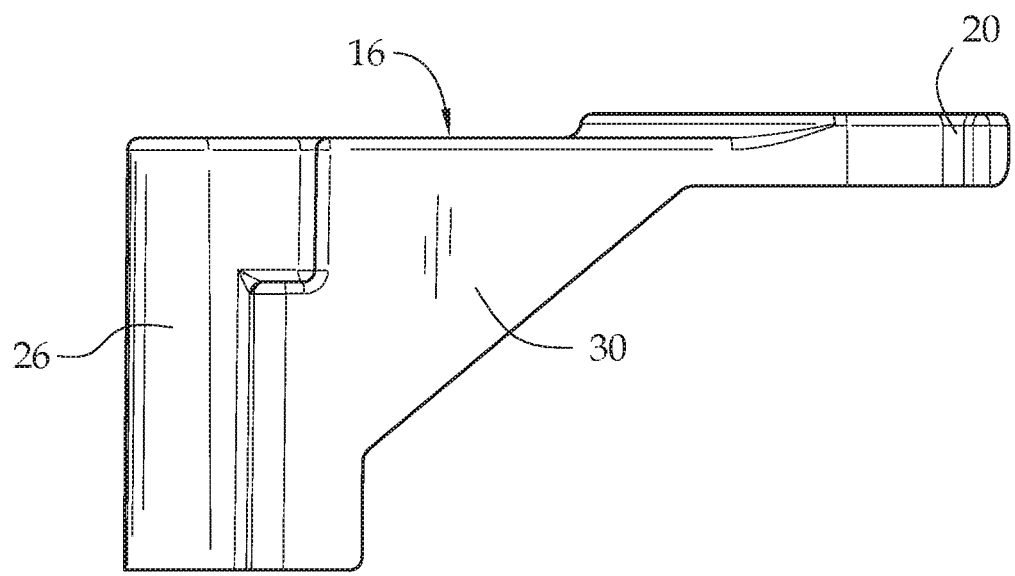
FIG. 9 is a right side elevational view of the body portion of the hands-free filling device.
Figure 10:
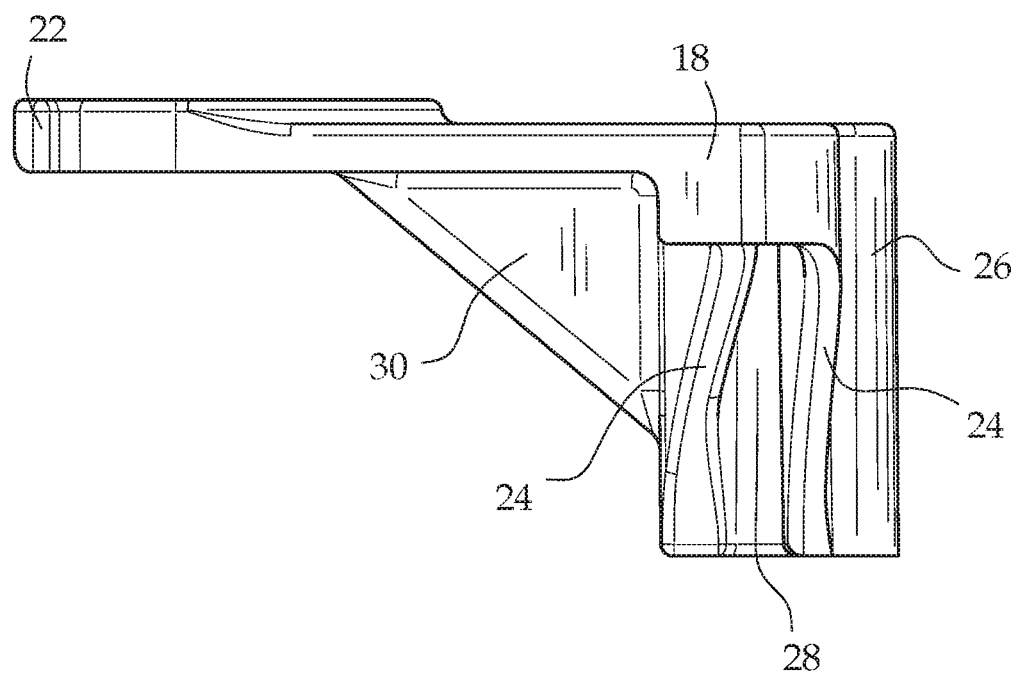
FIG. 10 is a left side elevational view of the body portion of the hands-free filling device.

With reference to FIGS. 1-10, the preferred embodiment of the hands-free tank filling device is shown. The device 10 may include a body portion 12 and a spring clamp 14. The body portion 12 preferably has an upright section 16 and a base section 18. An embodiment of base section 18 is oriented generally perpendicular to the upright section 16. The upright section 16 preferably has a pair of spaced-apart curved ears 20, 22 at an end remote from the base section 18. The curved ears 20, 22 ideally form a semi-circular opening. The resiliency defined in the ears 20, 22 forms a clip that can be used to hold a water filler tube 52 in place as seen in FIG. 4.

The base section of 18 of body portion 12 preferably includes a generally horizontal section 24 and a downward turned leg 26. The horizontal section 24 and leg 26 may define a channel 28. Preferred base section 18 extends rearward of the upright section 16 and extends at an angle from a side remote from the leg 26 to the side proximate the leg 26. Accordingly, the depth of base section 18 may be greatest at leg 26. To strengthen the connection between the base portion 18 and the upright portion 16, a support wall 30 (see FIGS. 2-4) joins the back of upright section 16 to base section 18. The support wall 30 preferably provides the necessary rigidity and strength to enable the body portion 12 to support the weight of a typical garden hose, for example, during a filling operation.

The spring clamp 14 may be defined by a circular section 32 and a pair of leg sections 34, 36. Leg 34 may include a portion 38 that is coplanar with the circular section 32, and a portion 48 that is oriented transverse to the plane of the circular section 32. Similarly, preferred leg 36 has a portion 40 that is coplanar with the circular section 32, and a portion 44 that is oriented transverse to the plane of the circular section 32. The transverse oriented portion 44 of leg 40 is ideally longer than the transverse portion 48 of leg 34. The transverse portion 44 is disposed within the channel 28 in base section 18 and terminates in a downward turned end 46. The transverse portion 48 of leg 34 is secured within a bore 42 at the rear of downward turned leg 26 (see FIG. 2). In this preferred (but exemplary) arrangement, transverse portion 44 of leg 36 is configured to move within the channel 28 of base section 18 to enlarge or reduce the diameter of the circular section 32 of spring clamp 14. Transverse portion 44 of leg 38 may also be placed in downward turned leg 26 of base 18 to temporarily hold the spring clamp 14 in position when the circular portion 32 is at its greatest diameter, or the "open" position.

With further reference to FIG. 4, the hands-free device 10 is illustrated attached to the collar 50 of the storage tank (not shown). Also illustrated in FIG. 4 is a fill tube 52. The fill tube 52 has a female threaded connector 54 adapted to be secured to a standard garden hose (not shown). The female threaded connector 54 is affixed to a hollow tubular member, which is disposed within the neck 58 of the storage tank (not shown). Hollow tube member 56 is shown clipped between curved ears 20, 22 of upright section 16 of body portion 12. In the embodiment shown, the fill tube 52 also has a shut-off valve 60 to enable the control of water flow at the tank fill location rather than the main water source.

In use, the hands-free device 10 is secured to the collar 50 of the storage tank by opening the circular section 32 of spring clamp 14, placing the circular section over the collar, and then releasing the spring leg 36. To facilitate the attachment of the spring clamp 14 to the collar 50, the transverse portion 44 of leg 36 may be placed within the end of channel 28 in downturned leg 26, temporarily holding the circular section 32 of spring clamp 14 in the open position. Once the spring clamp 14 is placed over collar 50, the transverse portion 44 of leg 36 is released from the downward turned leg 26 of base 18, whereby the transverse portion 44 of leg 36 may return to the opposite end of the channel to render the circular section in a "closed" position, thereby clamping the device 10 to the collar 50. The spring clamp 14 is preferably secured in this matter regardless of whether the collar 50 is a threaded style or a flange style collar. Separately, the fill tube 52 is attached to a garden hose via female threaded connector 54 and the hollow tube member 56 is placed within the neck 58 of the storage tank and clipped into position between the curved ears 20, 22. The supply of fresh water is then opened, either at the source or via shut-off valve 60 to begin filling the storage tank. The hands-free device 10 will hold the fill tube 52 in place so the operator is free to engage in other tasks while the storage tank is being filled.

The body portion 12 of the hands-free device 10 is preferably made from a robust plastic or composite material for ease of manufacture and economical considerations. Other materials may be used to advantage if desired, so long as they have the necessary strength to bear the weight and stress incurred during the filling operation. The material selected should also be rust-resistant as it will be exposed to wet conditions during use. The spring clamp 14 may be made of a rust resistant metal or coated to provide rust-resistance.

The illustrations and examples provided herein are for explanatory purposes and are not intended to limit the scope of the appended claims.

We claim:

1. A device for filling of a storage tank comprising: a body portion and a spring clamp connected to said body portion; the spring clamp having a circular section with a first diameter when in an open position and a second diameter when in a closed position, the spring clamp further comprising a pair of legs connected to said circular section, each of said legs having a portion disposed coplanar with the circular section and a portion disposed transverse to a plane of the circular section; wherein the transverse section of one leg is longer than the transverse section of the other leg; the body portion having an upright section configured for engagement with a filling hose.

2. The device of claim 1, wherein the upright section further defines an opening with a semi-circular shape, and wherein the circular section of the spring clamp and the semi-circular opening are axially aligned.

3. The device of claim 1, wherein the body portion further comprises a base section connected to said upright section; said base section defining a channel; and wherein said upright section further comprises a pair of ears located remote from the base section.

4. The device of claim 1, wherein the body portion further comprises a base section connected to said upright section; said base section defining a channel.

5. The device of claim 1, wherein the body portion further comprises a base section connected to said upright section; said base section having a downward turned leg at one end thereof; said base section and said downward turned leg defining a channel.

6. The device of claim 1, wherein the body portion further comprises a base section connected to said upright section; said base section having a downward turned leg at one end thereof; said base section and said downward turned leg defining a channel; wherein said upright section further comprises a pair of ears located remote from the base section.

7. The device of claim 1, wherein the body portion further comprises a base section connected to said upright section; said base section having a downward turned leg at one end thereof; said base section and said downward turned leg defining a channel said body portion further comprising a support wall connecting said base section to the upright section.

8. The device of claim 1, wherein the body portion further comprises a base section connected to said upright section; said base section having a downward turned leg at a terminal end thereof; said base section and said downward turned leg defining a channel; the channel in the downward turned leg of said base comprising a stop member to secure one of the legs of the spring clamp to hold the circular section in the open position.

9. The device of claim 1, wherein the transverse portion of the shorter leg is fixed in position.

10. The device of claim 1, wherein the transverse portion of the longer leg is disposed within the channel and wherein the transverse portion of the shorter leg is fixed in position.

11. The device of claim 1, wherein the body portion further comprises a base section connected to said upright section; said base section having a downward turned leg at one end thereof; said base section defining a channel; wherein the transverse portion of the shorter leg is fixed in position; wherein the transverse portion of the longer leg is disposed within the channel for operative movement of the circular section between the open and closed positions; the channel in the downward turned leg of said base comprising a stop member to secure one of the legs of the spring clamp while the circular section is in the open position.

12. The device of claim 1, further comprising a water filler tube.

13. The device of claim 1, further comprising a water filler tube; said water filler tube comprising a hollow tubular member attached to a female threaded connector.

14. The device of claim 1, further comprising a water filler tube; said water filler tube comprising a hollow tubular member attached to a female threaded connector; said hollow tubular member being sized to be secured within a semi-circular opening defined by a pair of curved ears.

15. The device of claim 1, further comprising a water filler tube; said water filler tube comprising a hollow tubular member attached to a female threaded connector; said hollow tubular member being sized to be secured within an opening defined by a pair of curved ears; said water filler tube further comprising a shut-off valve located between the female threaded connector and the hollow tubular member.

16. The device of claim 1, wherein the upright section includes an opening defining a semi-circular shape formed by a pair of curved ears.

17. A device for filling of a storage tank comprising: a body portion and a spring clamp connected to said body portion; the spring clamp having a circular section with a first diameter when in an open position and a second diameter when in a closed position; the body portion having an upright section configured for engagement with a filling hose and a base section connected to said upright section; said base section having a downward turned leg at one end thereof; said base section and said downward turned leg defining a channel; and wherein said spring clamp has a leg disposed within said channel for operative movement of the circular section between the open and closed positions.

\* \* \* \* \*